United States Patent
Baek et al.

(10) Patent No.: US 12,453,775 B2
(45) Date of Patent: Oct. 28, 2025

(54) COMPOSITION, FOR PREVENTION OR TREATMENT OF CANCER DISEASE, COMPRISING CYTOTOXIC T CELLS ACTIVATED BY T HELPER CELL-DERIVED EXTRACELLULAR VESICLES AS ACTIVE INGREDIENT

(71) Applicants: KYUNGPOOK NATIONAL UNIVERSITY INDUSTRY-ACADEMIC COOPERATION FOUNDATION, Daegu (KR); DAEGU GYEONGBUK INSTITUTE OF SCIENCE AND TECHNOLOGY, Daegu (KR)

(72) Inventors: Moon-Chang Baek, Daegu (KR); Kyungmoo Yea, Daegu (KR); Do Kyung Jung, Daegu (KR); Suyeon Ryu, Daegu (KR); Sang Hee Shin, Busan (KR); In Seong Jung, Daegu (KR)

(73) Assignees: KYUNGPOOK NATIONAL UNIVERSITY INDUSTRY-ACADEMIC COOPERATION FOUNDATION, Daegu (KR); DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 838 days.

(21) Appl. No.: 17/766,745

(22) PCT Filed: Sep. 18, 2020

(86) PCT No.: PCT/KR2020/012619
§ 371 (c)(1),
(2) Date: Apr. 6, 2022

(87) PCT Pub. No.: WO2021/071126
PCT Pub. Date: Apr. 15, 2021

(65) Prior Publication Data
US 2024/0091355 A1 Mar. 21, 2024

(30) Foreign Application Priority Data

Oct. 11, 2019 (KR) .................. 10-2019-0126173
Sep. 15, 2020 (KR) .................. 10-2020-0118557

(51) Int. Cl.
*A61K 40/42* (2025.01)
*A61K 40/11* (2025.01)
*A61P 35/00* (2006.01)
*C12N 5/0783* (2010.01)

(52) U.S. Cl.
CPC ............ *A61K 40/428* (2025.01); *A61K 40/11* (2025.01); *A61K 40/42* (2025.01); *A61P 35/00* (2018.01); *C12N 5/0636* (2013.01); *C12N 5/0638* (2013.01); *C12N 2501/2302* (2013.01)

(58) Field of Classification Search
CPC ...... A61K 40/11; A61K 40/42; A61K 40/428; C12N 5/0636; C12N 5/0638; C12N 2501/2302; A61P 35/00
See application file for complete search history.

(56) References Cited

FOREIGN PATENT DOCUMENTS

KR    10-2018-0063841 A    6/2018
WO       2018/183930 A1   10/2018

OTHER PUBLICATIONS

Nagai et al. Cancer prevention from the perspective of global cancer burden patterns. J. Thorac Dis (2017), 9(3), 448-451. (Year: 2017).*
International Search Report for PCT/KR2020/012619 mailed Jan. 13, 2021 from Korean Intellectual Property Office.
Seo, Naohiro et al., "Activated CD8+ T cell extracellular vesicles prevent tumour progression by targeting of lesional mesenchymal cells", Nature Communications, 2018, vol. 9, Article No. 435, inner pp. 1-11.
Jian Lu et al., "CD4+ T Cell-Released Extracellular Vesicles Potentiate the Efficacy of the HBsAg Vaccine by Enhancing B Cell Responses", Advanced Science, 2019, vol. 6, 1802219, inner pp. 1-12.
Lei Li et al., "IL-12 stimulates CTLs to secrete exosomes capable of activating bystander CD8+ T cells", Scientific Reports, 2017, vol. 7, Article No. 13365, inner pp. 1-10.
Haifeng Zhang et al., "CD4l T cell-released exosomes inhibit CD81 cytotoxic T-lymphocyte responses and antitumor immunity", Cellular & Molecular Immunology, 2011, vol. 8, 1802219, pp. 23-30.
Xiaowu Hong et al., "Effects of exosome on the activation of CD4+ T cells in rhesus macaques: a potential application for HIV latency reactivation", Scientific Reports, 2017, vol. 7, Article No. 15611, inner pp. 1-9.
Office Action of European Patent Application No. 20875550.4 mailed Jun. 2, 2023.

(Continued)

Primary Examiner — Sean C. Barron
(74) Attorney, Agent, or Firm — Revolution IP, PLLC

(57) ABSTRACT

The present invention relates to a composition, for prevention or treatment of cancer diseases, comprising CD8+ T cells activated by CD4+ T cell-derived extracellular vesicles as an active ingredient. It was found that the secretion of extracellular vesicles from cytokine-activated CD4+ T cells increases and the extracellular vesicles enhance proliferation and activity of CD8+ T cells to induce the death of cancer cells, thereby augmenting an anticancer effect. Thus, the present invention provides the CD8+ T cells activated by CD4+ T cell-derived extracellular vesicles as a pharmaceutical agent or an immunotherapeutic agent for cancer diseases, and a method for activating CD8+ T cells by using CD4+ T cell-derived extracellular vesicles to prepare CD8+ T cells showing excellent anticancer activity as described above.

9 Claims, 6 Drawing Sheets
Specification includes a Sequence Listing.

(56) References Cited

OTHER PUBLICATIONS

Siguo Hao et al., "Mature dendritic cells pulsed with exosomes stimulate efficient cytotoxic T-lymphocyte responses and antitumour immunity", Cancer Research, Wiley-Blackwell Publishing Ltd, GB, vol. 120, No. 1, Jan. 16, 2007, pp. 90-102.
Haifeng Zhang et al., "CD4+ T cell-released exosomes inhibit CD8+ cytotoxic T-lymphocyte responses and antitumor immunity", Cellular & Molecular Immunology, vol. 8, No. 1, Dec. 13, 2010, pp. 23-30.
Jannie Borst et al., "CD4+ T cell help in cancer immunology and immunotherapy", Nature Reviews Immunology, 2018, vol. 18, No. 10, pp. 635-647.

* cited by examiner

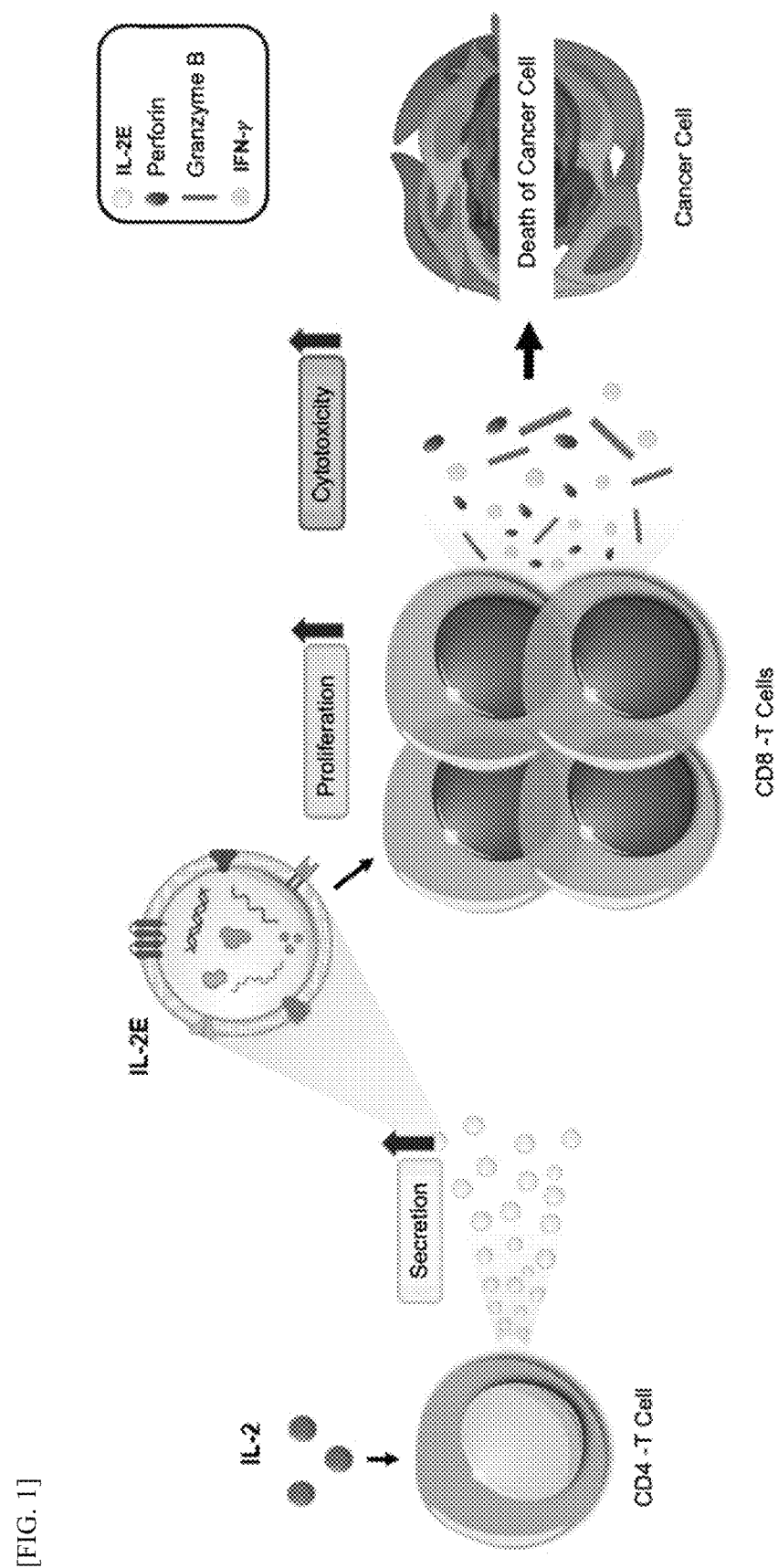
[FIG. 1]

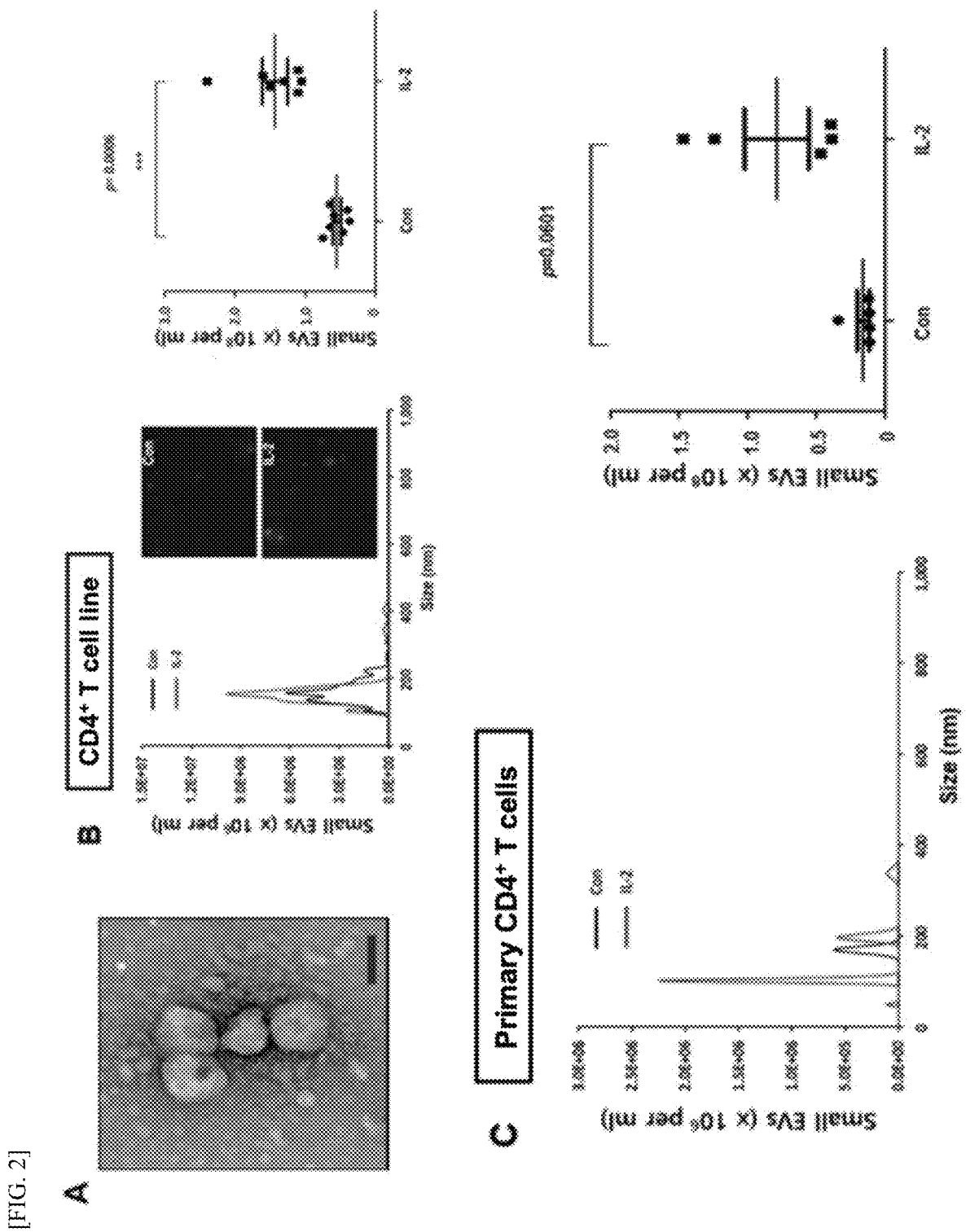
[FIG. 2]

[FIG. 3]
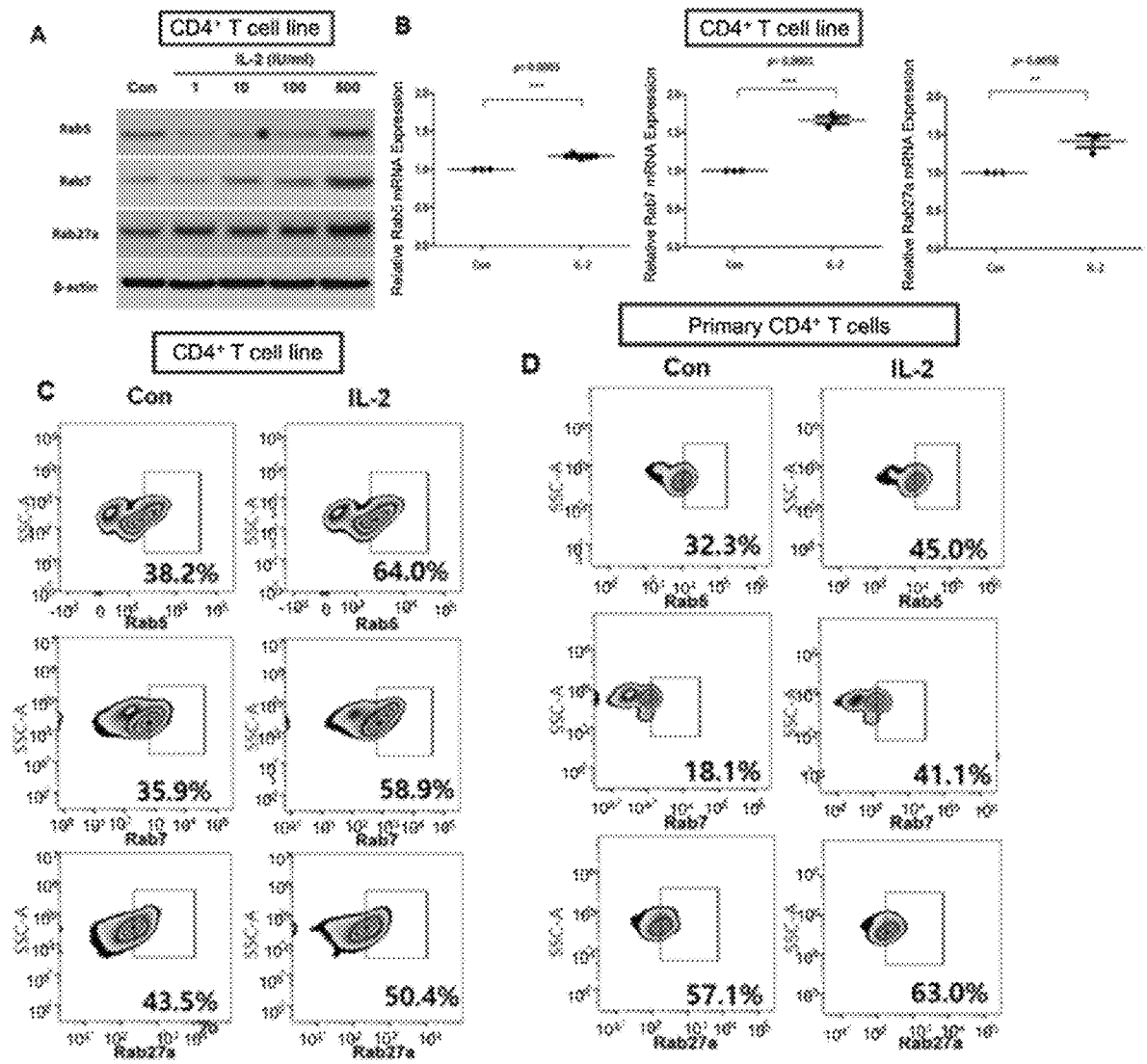

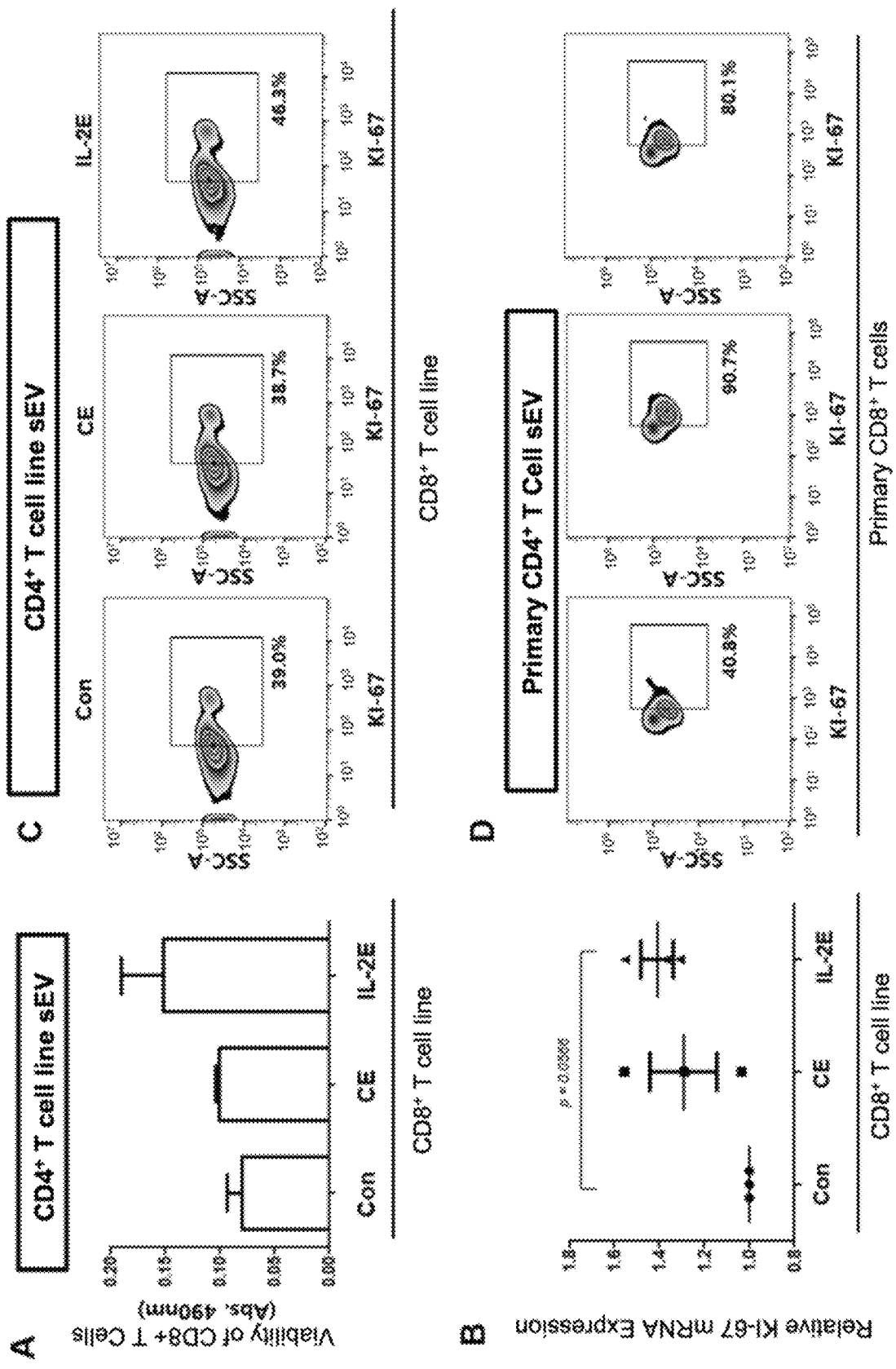
[FIG. 4]

[FIG. 5]
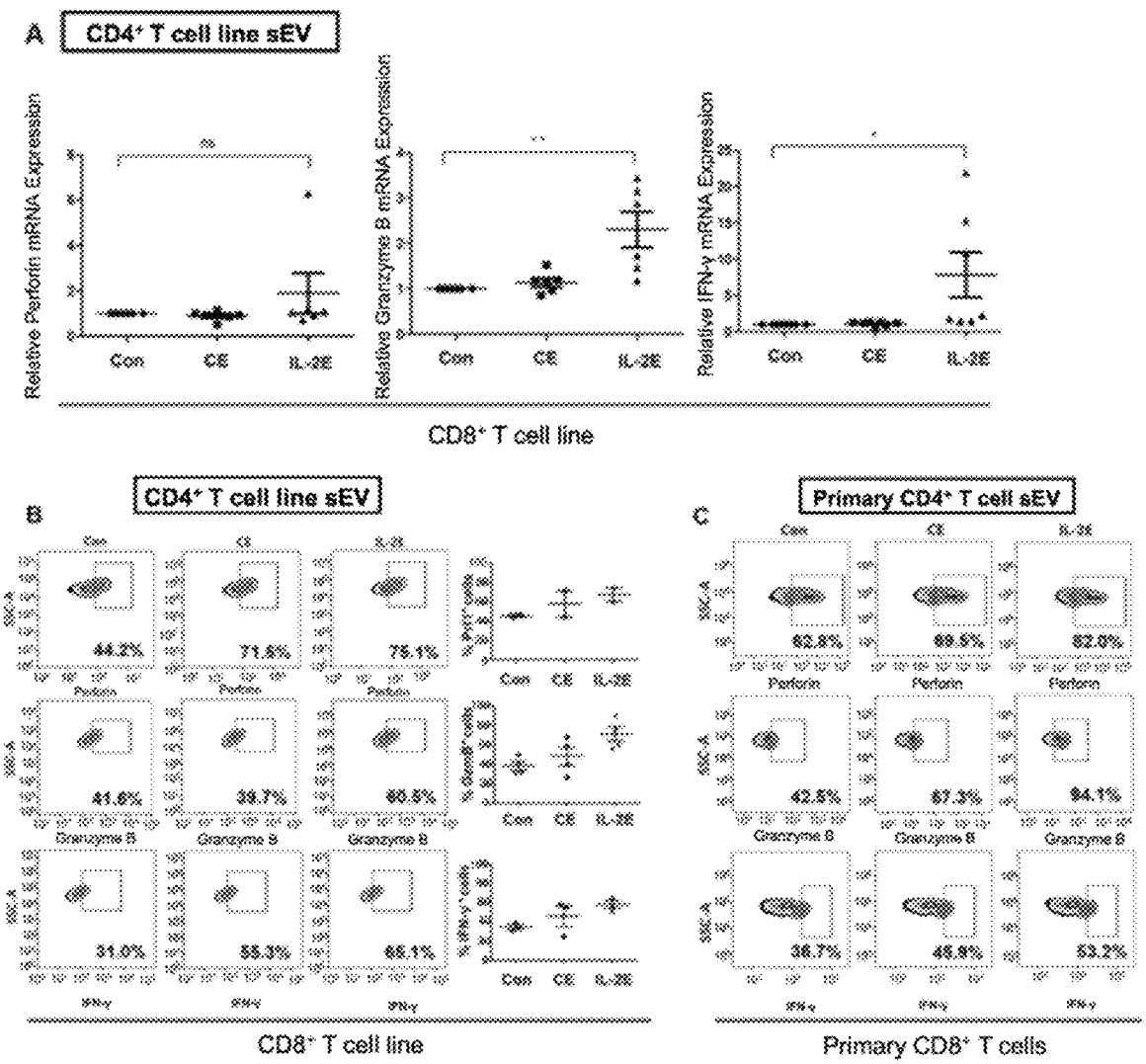

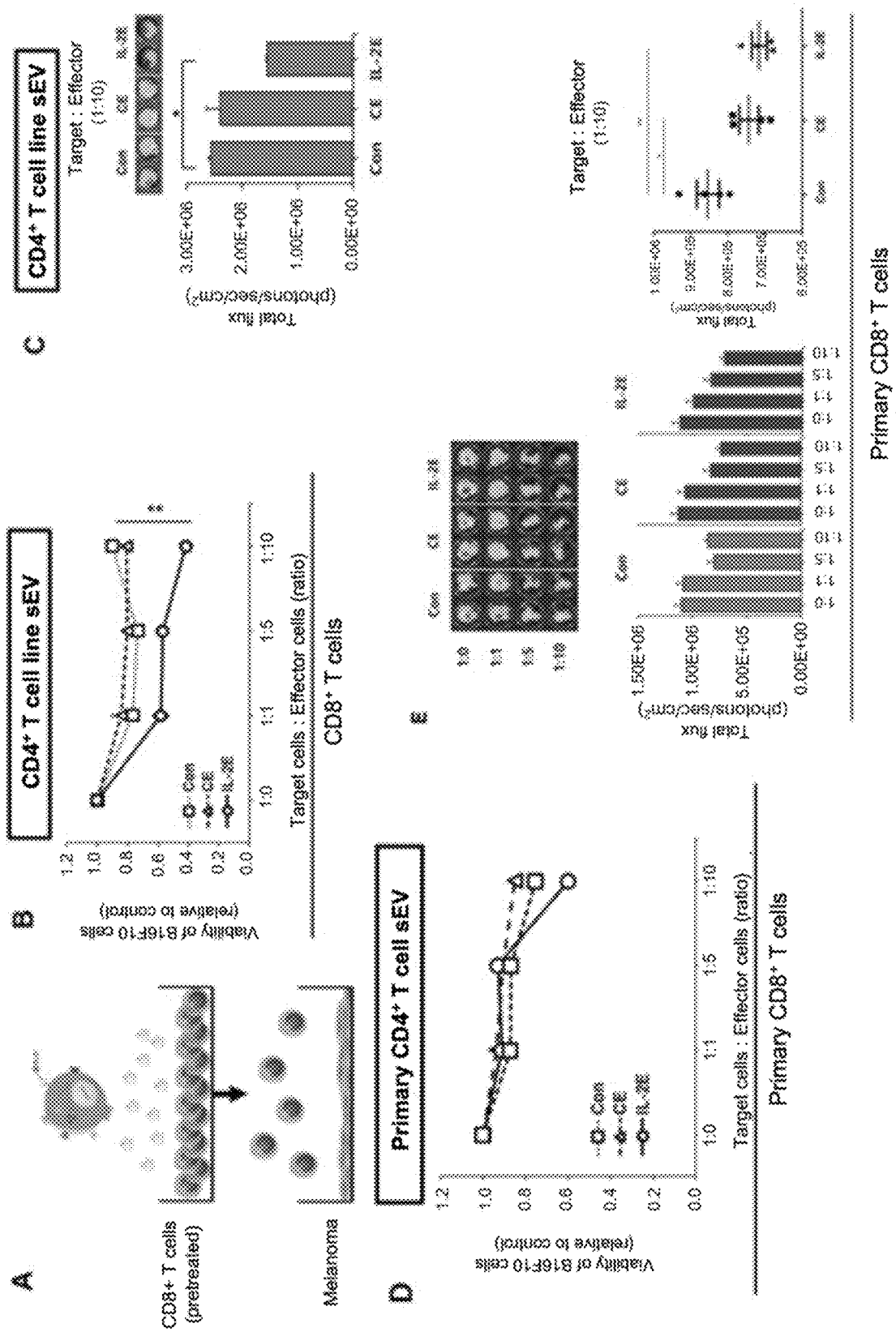
[FIG. 6]

COMPOSITION, FOR PREVENTION OR TREATMENT OF CANCER DISEASE, COMPRISING CYTOTOXIC T CELLS ACTIVATED BY T HELPER CELL-DERIVED EXTRACELLULAR VESICLES AS ACTIVE INGREDIENT

CROSS REFERENCE TO PRIOR APPLICATIONS

This application is the 35 U.S.C. 371 national stage of International application PCT/KR2020/012619 filed on Sep. 18, 2020 which claims priority to Korean Patent Application Nos. 10-2019-0126173 filed on Oct. 11, 2019 and 10-2020-0118557 filed on Sep. 15, 2020. The entire contents of each of the above-identified applications are hereby incorporated by reference.

SEQUENCE LISTING

This application contains a Sequence Listing submitted via EFS-Web and hereby incorporated by reference in its entirety. The Sequence Listing is named SEQCRF-2280-376.txt, created on Jan. 10, 2022, and 4,096 bytes in size.

TECHNICAL FIELD

The present invention relates to a composition, for prevention or treatment of cancer diseases, containing CD8+ T cells activated by CD4+ T cells-derived extracellular vesicles as an active ingredient.

BACKGROUND ART

Small extracellular vesicles (sEVs) are small membrane vesicles secreted from most cells. The diameter of the extracellular vesicle is approximately 30-100 nm, and it contains various types of proteins, genetic materials (DNA, RNA, miRNA), lipids, and the like, originating from the cell. The extracellular vesicles are released and secreted out of the cell, originating in specific intracellular compartments called multivesicular bodies (MVBs), rather than directly detaching from plasma membrane. In other words, when fusion of the multivesicular bodies and the plasma membrane occurs, vesicles are released into the extracellular environment, which are called the extracellular vesicles. Although it has not been identified exactly by what mechanism the extracellular vesicles are made, it is known that they are isolated and released from various cell types under both normal and pathological conditions.

Cancer is a result of uncontrolled and disordered cell proliferation caused by an abnormal excess of cells. From a molecular biological point of view, cancer is a disease caused by genetic mutation. There are dozens of types of cancer that have been identified so far, and they are mainly classified according to the location of the diseased tissue. Cancer is divided into benign and malignant tumors. Benign tumors grow relatively slowly and do not metastasize from their primary site to other tissues, whereas malignant tumors leave their primary site, invade other tissues, and grow rapidly, and are life-threatening due to this characteristic. Most cancers are asymptomatic in the early stages, and even if there are symptoms, they are mild, so most people tend to overlook them, which increases the cancer death rate.

Surgical therapy, chemotherapy, radiation therapy, and the like, are used for treatment of cancer, but it is reported that more than 50% of all cancer patients eventually die without being cured despite many studies. The reason is that cancer recurs because microscopically metastasized cancer cells are not removed even after surgical resection, death of cancer cells is not induced by an anticancer drug, or cancer cells that have developed resistance to the anticancer drug rapidly increase during or after the treatment although tumor appears to be shrinking due to a response to the anticancer drug at the initial stage. Today, about 60 types of various anticancer drugs are being used, and researches on the development of new anticancer drugs are being actively conducted as knowledge about cancer occurrence and characteristics of cancer cells is widely known. However, most anticancer drugs cause serious side effects such as nausea and vomiting, hair loss, skin and nail discoloration, and nervous system side effects, and have a disadvantage of losing their therapeutic effects because the cancer cells acquire resistance to the anticancer drugs when repeatedly administered for a long period of time or when cancer recurs. Further, the radiation therapy induces the death of cancer cells by irradiating high-energy radiation to the cancer tissue, but has a disadvantage of damaging normal tissues around the cancer tissue to cause side effects.

Accordingly, helper T cells activated by cytokines-derived extracellular vesicles can activate cytotoxic T cells, and development of the technology can maximize the effects of cancer prevention and treatment.

PRIOR ART DOCUMENT

Patent Document

Patent Document 1: Korean Patent Application Publication No. 10-2018-0063841 (published on Jun. 12, 2018)

DISCLOSURE

Technical Problem

The present invention relates to a composition, for prevention or treatment of cancer diseases, containing cytotoxic T cells (CD8+ T cells) activated by T helper cell (CD4+ T cell)-derived extracellular vesicles as an active ingredient. It has been found that secretion of extracellular vesicles from cytokine-activated CD4+ T cells increases and the extracellular vesicles enhance proliferation and activity of CD8+ T cells to induce death of cancer cells, thereby augmenting an anticancer effect. The CD8+ T cells activated by the CD4+ T cell-derived extracellular vesicles can be usefully used as a composition for preventing or treating cancer diseases, as a composition for immune anticancer drugs, and the like. Thus, the present invention provides the CD8+ T cells activated by the CD4+ T cell-derived extracellular vesicles as a pharmaceutical agent or an immunotherapeutic agent for cancer diseases, and a method for activating CD8+ T cells by using the CD4+ T cell-derived extracellular vesicles to prepare CD8+ T cells exhibiting excellent anticancer activity as described above.

Technical Solution

The present invention provides a pharmaceutical composition, for prevention or treatment of cancer diseases, containing CD8+ T cells activated by CD4+ T cell-derived extracellular vesicles as an active ingredient.

Further, the present invention provides a composition for immune anticancer agents, containing CD8+ T cells activated by CD4+ T cell-derived extracellular vesicles as an active ingredient.

Furthermore, the present invention provides a method for activating CD8+ T cells, including: activating CD4+ T cells by treatment with cytokines; and treating the CD8+ T cells with extracellular vesicles derived from the activated CD4+ T cells.

Advantageous Effects

According to the present invention, it was found that secretion of extracellular vesicles from cytokine-activated CD4+ T cells increases and the extracellular vesicles enhance proliferation and activity of CD8+ T cells to induce death of cancer cells, thereby augmenting the anticancer effect. Therefore, the CD8+ T cells activated by CD4+ T cell-derived extracellular vesicles can be usefully used as a composition for preventing or treating cancer diseases, a composition for immune anticancer drugs, and the like.

BRIEF DESCRIPTIONS OF DRAWINGS

FIG. 1 is a diagram showing increased secretion of extracellular vesicles derived from CD4+ T cells activated by IL-2 and an anticancer effect of CD8+ T cells activated by the extracellular vesicles.

FIG. 2 shows a result of determining extracellular vesicle size verification and increases in secretion by IL-2 in CD4+ T cells and Primary CD4+ T cells through nanoparticle tracking analysis.

FIG. 3 shows a result of determining increases in the expression of Rab5, 7, 27a by IL-2 in CD4+ T cells and Primary CD4+ T cells by performing Western blot, real-time polymerase chain reaction, and flow cytometry analysis.

FIGS. 4 and 5 shows results of determining increases in proliferation and activity of CD8+ T cells and Primary CD8+ T cells using extracellular vesicles derived from CD4+ T cells and Primary CD4+ T cell activated by IL-2.

FIG. 6 shows a result of determining increases in anticancer activity of CD8+ T cells and Primary CD8+ T cells using extracellular vesicles derived from CD4+ T cells and Primary CD4+ T cell activated by IL-2.

BEST MODE

The terms used herein have been selected as currently widely used general terms as possible while considering the functions in the present invention, but may vary depending on the intention of a person skilled in the art or precedent, the emergence of new technology, or the like. Further, in a specific case, there is a term arbitrarily selected by the applicant, and in this case, its meaning will be described in detail in the description of the corresponding invention. Therefore, the term used herein should be defined based on the meaning of the term and the overall content of the present invention, rather than simply the name of the term.

Unless defined otherwise, all terms used herein, including technical or scientific terms, have the same meaning as commonly understood by persons skilled in the art to which this invention pertains. Terms commonly used such as those defined in dictionaries should be construed as having meanings consistent with the meanings in the context of the related art, and are not to be construed in ideal or overly formal meanings unless explicitly defined in the present application.

A numerical range is inclusive of numerical values defined in the range. Every maximum numerical limitation given throughout this specification includes any lower numerical limitation as if the lower numerical limitation were expressly written. Every minimum numerical limitation given throughout this specification includes any higher numerical limitation as if the higher numerical limitation were expressly written. Every numerical limitation given throughout this specification will include any narrower numerical range within a broader numerical range, as if the narrower numerical limitation were expressly written.

Hereinafter, the present invention will be described in more detail.

As shown in FIG. 1, the inventors of the present invention determined that, in the case that CD4+ T cells were treated with cytokines, secretion of extracellular vesicles was increased, and in the case that CD8+ T cells were treated with CD4+ T cell-derived extracellular vesicles, CD8+ T cells exhibited a more increased effect compared to the anticancer effect they had in the normal state. In other words, the present invention was completed by determining that the extracellular vesicles increased the proliferation ability and cytotoxicity ability of CD8+ T cells to induce the death of cancer cells, thereby enhancing the anticancer effect.

The present invention provides a pharmaceutical composition, for prevention or treatment of cancer diseases, containing CD8+ T cells activated by CD4+ T cell-derived extracellular vesicles as an active ingredient.

The CD4+ T cells are activated by a cytokine, and the cytokine may be one or more selected from the group consisting of IL-2, IL-4, IL-7, IL-9, IL-15, and IL-21, preferably IL-2, but is not limited thereto.

The extracellular vesicles can increase the proliferation of CD8+ T cells, and increase the expression of IFN-γ, perforin, and granzyme B, which are markers of cytotoxicity, thereby enhancing the anticancer effect.

The extracellular vesicles are small extracellular vesicles (sEV) having a diameter of 50 to 100 nm, and may include exosomes and microvesicles, but it should be noted that the present invention is not limited thereto.

The cancer disease may be selected from the group consisting of melanoma, skin cancer, lung cancer, liver cancer, stomach cancer, pancreatic cancer, bone cancer, head or neck cancer, uterine cancer, ovarian cancer, breast cancer, fallopian tube carcinoma, endometrial carcinoma, cervical carcinoma, vaginal carcinoma, vulvar carcinoma, Hawkins' disease, esophageal cancer, small intestine cancer, colorectal cancer, colon cancer, rectal cancer, perianal cancer, endocrine adenocarcinoma, thyroid cancer, parathyroid cancer, adrenal cancer, soft tissue sarcoma, urethral cancer, penile cancer, prostate cancer, chronic or acute leukemia, lymphocytic lymphoma, bladder cancer, kidney or ureter cancer, renal cell carcinoma, renal pelvic carcinoma, central nervous system tumor, primary central nervous system lymphoma, spinal cord tumor, brainstem glioma, and pituitary adenomalt, but is not limited thereto.

In the case that the composition of the present invention is a pharmaceutical composition, it may include a pharmaceutically acceptable carrier, excipient, or diluent for administration, in addition to the active ingredient described above. The carrier, excipient, and diluent may include lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinylpyrrolidone, water, methylhydroxybenzoate, propylhydroxybenzoate, talc, magnesium stearate, and mineral oil.

The pharmaceutical composition of the present invention may be formulated and used in an oral dosage form such as powders, granules, tablets, capsules, suspensions, emulsions, syrups, or aerosols, or in the form of external preparations, suppositories, or sterile injection solutions, according to conventional methods, respectively. Specifically, when formulating, the diluent or excipient may be used such as a filler, a bulking agent, a binder, a wetting agent, a disintegrant, and a surfactant commonly used. Solid preparations for oral administration include, but are not limited to, tablets, pills, powders, granules, and capsules. Such a solid preparation may be prepared by mixing one or more excipients, for example, starch, calcium carbonate, sucrose, lactose, and gelatin, in addition to the active ingredient. In addition to simple excipients, lubricants such as magnesium stearate and talc may also be used. It may be prepared by adding various excipients, for example, wetting agents, sweetening agents, fragrances, and preservatives, in addition to liquids for oral use and liquid paraffin. Formulations for parenteral administration include sterile aqueous solutions, non-aqueous solvents, suspensions, emulsions, lyophilized formulations, and suppositories. As the non-aqueous solvent and suspension, propylene glycol, polyethylene glycol, vegetable oil such as olive oil, and injectable esters such as ethyl oleate may be used. As the base of the suppository, Witepsol, Macrosol, Tween 61, cacao butter, laurin fat, and glycerogelatin may be used.

A suitable dosage of the pharmaceutical composition of the present invention varies depending on the patient's condition and weight, the degree of disease, drug form, and time, but may be appropriately selected by those skilled in the art. The daily dosage of the composition is preferably 0.001 mg/kg to 50 mg/kg, and may be administered once a day or divided into several times a day as needed.

In addition, the present invention provides a method for activating CD8+ T cells, including: activating CD4+ T cells by treatment with a cytokine; and treating the CD8+ T cells with extracellular vesicles derived from the activated CD4+ T cells.

The cytokine of the step of activating CD4+ T cells may be selected from the group consisting of IL-2, IL-4, IL-7, IL-9, IL-15, and IL-21, but is not limited thereto.

MODES FOR CARRYING OUT INVENTION

Hereinafter, the present invention will be described in more detail using examples. These examples are merely for illustrating the present invention in more specifically, and it would be apparent to those skilled in the art that the scope of the present invention is not limited by these examples.

Example 1: Cell Culture

B16F10 cells (mouse melanoma) were cultured in DMEM medium (Hyclone) supplemented with 10% fetal bovine serum (FBS) and 1% penicillin and streptomycin (Hyclone), and CD4+ T cells (human T lymphocytes) were cultured in RPMI 1640 medium supplemented with 10% FBS and 1% penicillin and streptomycin. CD8+ T cells (mouse cytotoxic T lymphocytes) were cultured in RPMI 1640 medium supplemented with 10% FBS, 1% penicillin and streptomycin, and recombinant IL-2 (R&D system) at 20 IU/mL. Primary CD4+ T cells and Primary CD8+ T cells (isolated from PBMC) were cultured in RPMI 1640 medium supplemented with 10% FBS and 1% penicillin and streptomycin.

Example 2: Isolation of Primary CD4+ T Cells and Primary CD8+ T Cells from Human Peripheral Blood Mononuclear Cells After 50 ml of blood was collected using a 50 ml syringe and transferred to a vacuum (BD Vacutainer) containing heparin, the supernatant was removed by centrifugation at 550×g for 10 minutes. After that, it was mixed with PBS 1:1. Then, 5 ml of ficoll (GE Healthcare) per 8 ml of blood mixed with PBS was added and centrifuged at 550×g for 30 minutes. Then, the supernatant was removed and the Buffy coat layer was transferred to a new 50 ml conical tube. After adding PBS to 30 ml, it was centrifuged at 550×g for 10 minutes. Thereafter, the pellet was mixed with RPMI 1640 medium supplemented with 10% FBS and 1% penicillin and streptomycin, and cultured on a 10 cm plate (Cat, 430167; Corning) for 16 hours.

After culturing human peripheral blood mononuclear cells for 16 hours, Primary CD4+ T cells and Primary CD8+ T cells were isolated using Human CD4+ T cell isolation kit (Cat, 130-096-533; MACS) and Human CD8+ T cell isolation kit (Cat, 130-096-495; MACS).

The number of the human peripheral blood mononuclear cells in culture on the 10 cm plate (Cat, 430167; Corning) was counted through tryphan blue staining, and then they were centrifuged at 550×g for 10 minutes. After that, 40 ul of Macs buffer per $10^7$ was added. After that, 10 ul of Biotin-Ab cocktail per $10^7$ was added and mixed and incubated at 4° C. for 5 minutes. After that, 20 ul of microbead cocktail per $10^7$ was added and mixed and incubated at 4° C. for 10 minutes. After that, an LS column was placed in a magnetic field of a MACS separator. After that, the column was washed three times with 1 ml of Macs buffer each time. Thereafter, the cell supernatant, which was incubated for 10 minutes, was put into the column and flow-through was received in a 5 ml tube. The above process was repeated 3 times to obtain a total of 3 ml of the cell supernatant and it was centrifuged at 550×g for 10 minutes. Then, the pellet was mixed with RPMI 1640 medium supplemented with 10% FBS and 1% penicillin and streptomycin, and cultured on a 10 cm plate (Cat, 430167; Corning).

Example 3: Analysis of Extracellular Vesicles (sEV) Derived from CD4+ T Cells and Primary CD4+ T Cells Activated by IL-2

3-1. Nanoparticle Tracking Analysis

CD4+ T cells were added at a density of $2 \times 10^6$ per 10 cm plate (Cat. 430167; Corning) and treated with various concentrations of IL-2 (0 IU/ml, 1 IU/ml, 10 IU/ml, 100 IU/ml, 500 IU/ml) and then cultured for 48 hours. Then, in order to collect the extracellular vesicles, the medium was replaced with a medium supplemented with no FBS and the cells were further cultured for 24 hours. Cell culture supernatant was recovered and centrifuged to remove cells and debris. Then, to isolate CD4+ T cell-derived extracellular vesicles (CE) or T cell-derived extracellular vesicles activated by IL-2 (IL-2E), each supernatant obtained from the cells was centrifuged continuously at 300×g, 2500×g, 10,000×g. The supernatant was then filtered through a 0.2 μm syringe filter and centrifuged at 120,000×g. The extracellular vesicle pellet was resuspended in PBS and centrifuged again at 120,000×g. The purified pellet was resuspended in PBS or 1× cell lysis buffer for the next experiment. Thereafter, the size and concentration of the extracellular vesicles were measured using Nanosight LM10 (Malvern Instruments) equipped with fast video capture and particle tracking software. This process was carried out in the same way in primary CD4+ T cells.

As a result, as shown in FIG. 2, in the case that CD4+ T cells and Primary CD4+ T cells were treated with IL-2, it was determined that the secretion of extracellular vesicles was increased in a concentration-dependent manner.

3-2. Flow Cytometry

The CD4+ T cells and Primary CD4+ T cells were washed with PBS and then fixed with 4% paraformaldehyde at room temperature for 15 minutes. Then, PBS (Cat. SH30028.02; Hyclone) containing 0.1% Triton-X (CAS #. 9002-93-1; Biosesang) was added, and reacted at room temperature for 10 minutes to permeate the cells. After permeation, the sample was reacted with primary antibodies at 4° C. for 1 hour, washed with PBS, reacted with secondary antibodies (1:2000 dilution) at 4° C. for 1 hour, and washed with PBS and flow cytometry (FACSAria III; Becton Dickinson) was performed. Data was analyzed using FlowJo software (Flowjo, Ashland, OR, USA).

The primary antibodies used in this experiment were: Rab5 (ab18211, 1:100; Abcam), Rab7 (ab50533, 1:100; Abcam), Rab27a (ab55667, 1:100; Abacm).

As a result, as shown in FIG. 3, in the case that the CD4+ T cells and the Primary CD4+ T cells were treated with 500 IU/ml of IL-2, it was determined that the expression of Rab enzymes (Rab5, Rab7, Rab27a) involved in the production and secretion of the extracellular vesicles was increased.

Example 4: Purification of Extracellular Vesicles (sEV) Derived from CD4+ T Cells and Primary CD4+ T Cells Activated by IL-2

The CD4+ T cells or CD4+ T cells activated by IL-2 (500 IU/ml) were washed with phosphate buffered saline (PBS) and further cultured in RPMI 1640 medium without FBS for 24 hours.

For extracellular vesicle purification, the cell culture supernatant was recovered by centrifugation at room temperature at 1,200 rpm for 5 minutes, and then the supernatant was centrifuged at 2000×g for 30 minutes to remove cells and debris. Then, to isolate CD4+ T cell-derived extracellular vesicles (CE) or IL-2 activated T cell-derived extracellular vesicles (IL-2E), each supernatant obtained from the cells was centrifuged continuously at 300×g, 2500×g, and 10,000×g. The supernatant was then filtered through a 0.2 μm syringe filter and centrifuged at 120,000×g. The extracellular vesicle pellet was resuspended in PBS and centrifuged again at 120,000×g. The purified pellet was resuspended in PBS or 1× cell lysis buffer for the next experiment.

Example 5: Analysis of Anticancer Effect in CD8+ T Cells and Primary CD8+ T Cells Activated by Extracellular Vesicles of CD4+ T Cells and Primary CD4+ T Cells 5-1. Flow Cytometry Next, CD8+ T cells were treated with extracellular vesicles purified from CD4+ T cells activated by IL-2 to evaluate effects of the extracellular vesicles. Briefly, CD8+ T cells were seeded in a 6-well plates at a density of 1×10$^5$ cells/well, and cultured with CE (CD4+ T cell-derived extracellular vesicles) or IL-2E (IL-2 activated CD4+ T cell-derived extracellular vesicles) (25 μg/ml) for 24 hours. Then, flow cytometry was performed for Ki-67, IFN-γ, Perforn, and Granzyme B. In addition, Primary CD8+ T cells were treated with extracellular vesicles purified from Primary CD4+ T cells, and flow cytometry was performed in the same manner as above.

The primary antibodies used in this experiment were: anti-Ki-67 (ab16667, 1:500; Abcam), Perform (ab16074, 1:500; Abcam), IFN-g (ab9657, 1:500; Abcam), Granzyme B (ab4059, 1:500 Abcam).

As a result, as shown in FIG. 4, in the case that CD8+ T cells were treated with IL-2 activated CD4+ T cell-derived extracellular vesicles (IL-2E), it was determined that the expression of Ki-67 protein, a cell proliferation marker, was increased by about 7% compared to the control group. Further, in the case that Primary CD8+ T cells were treated with IL-2 activated Primary CD4+ T cell-derived extracellular vesicles (IL-2E), it was determined that the expression of Ki-67 protein, a cell proliferation marker, increased by about 40% compared to the control group.

Furthermore, as shown in FIG. 5, in the case that CD8+ T cells were treated with IL-2 activated CD4+ T cell-derived extracellular vesicles (IL-2E) and Primary CD8+ T cells were treated with IL-2 activated Primary CD4+ T cell-derived extracellular vesicles (IL-2E), it was determined that the expression of IFN-γ, perforn, and granzyme B protein, which are markers of cytotoxicity in both, also increased compared to the control group or the CE treatment group. In particular, perforn and granzyme B showed significant increases compared to the control group or the CE treatment group.

Therefore, it was determined that IL-2 activated CD4+ T cell-derived extracellular vesicles and IL-2 activated Primary CD4+ T cell-derived extracellular vesicles (IL-2E) enhanced the cytotoxic ability of CD8+ T cells, thereby enhancing the anticancer effect.

5-2. Real-Time Polymerase Chain Reaction

After extracting mRNA (MiniBEST Universal RNA Extraction Kit, #9767; TaKaRa) from CD8+ T cells, the concentration of mRNA was measured using nanodrop (DS-11 Series Spectrophotometer; DeNovix). After synthesizing cDNA (PrimeScript™ 1st strand cDNA Synthesis Kit, #6110A; TaKaRa) with 100 ng of mRNA, gene expression was detected using TB Green™ Premix Ex Taq™ (Tli RNaseH Plus) kit (#RR420A; TaKaRa).

The primers used in this experiment are shown in Table 1 below.

TABLE 1

| Gene | | Base Sequence | SEQ ID NO: |
|---|---|---|---|
| PD-1 | F | 5'-AGA ATC CTG GAG ACC TCA AC-3' | 1 |
|  | R | 5'-ATA CCC ACT AGG GCA CTC AT-3' | 2 |
| Ki-67 | F | 5'-CAT CAA GGA ACA GCC TCA ACC-3' | 3 |
|  | R | 5'-GAC CTA CGG CGT TGA TCA CT-3' | 4 |
| IFN-γ | F | 5'-GAC AAT GAA CGC TAC ACA CT-3' | 5 |
|  | R | 5'-TAG GCT TTC AAT GAC TGT GC-3' | 6 |

TABLE 1-continued

| Gene | | Base Sequence | SEQ ID NO: |
|---|---|---|---|
| Granzyme B | F | 5'-CTA CTG CTG ACC TTG TCT CT-3' | 7 |
| | R | 5'-AAA GTA AGG CCA TGT AGG GT-3' | 8 |
| Perforin | F | 5'-TTT CGC CTG GTA CAA AAA CC-3' | 9 |
| | R | 5'-AGG GCT GTA AGG ACC GAG AT-3' | 10 |

Real-time polymerase chain reaction was performed using a StepOnePlus Real-Time PCR System (Applied Biosystems). The relative mRNA level of the sample was calculated by Ct (comparative threshold cycle) analysis after normalization to the amount of GAPDH in the same sample, and was expressed as a $2^{-\Delta\Delta C_t}$ value modified from the initial Ct value.

As a result, as shown in FIG. 4, it was determined that the mRNA expression level of Ki-67, a marker of T cell proliferation, was increased in the case of treating CD8+ T cells and the extracellular vesicles of Primary CD4+ T cells. In addition, as shown in FIG. 5, it was determined that in the case of treating CD8+ T cells and the extracellular vesicles of Primary CD4+ T cells, the mRNA expression levels of IFN-γ, Granzyme B, and Perform, which are markers of T cell activation, were increased. This means that the ability of CD8+ T cells to attack cancer cells is promoted, thereby enhancing the anticancer effect.

Example 6: Analysis of Co-Culture of CD8+ T Cells Pretreated with Extracellular Vesicles and Melanoma Cells After CD8+ T cells were seeded in a 6-well plate at a density of 1×10⁵ cells/well, they were pretreated with CE (extracellular vesicles derived from CD4+ T cells) or IL-2E (extracellular vesicles derived from CD4+ T cells activated by IL-2) (25 μg/ml). After 24 hours of culture, the cells were cultured in a 96-well plate with different ratios of melanoma cells (1:1 to 1:10) for 72 hours. At the end of the culture, MTS (#G3582; Promega) reagent was added to each well and cultured at 37° C. for 2 hours. Thereafter, the MTS reagent including the supernatant of each well was removed, and absorbance was measured at 490 nm using a microplate reader. In addition, CD8+ T cells isolated from human PBMC were pretreated with CE (extracellular vesicles derived from Primary CD4+ T cells) or IL-2E (extracellular vesicles derived from Primary CD4+ T cells activated by IL-2) (25 μg/ml) in the same way and the same procedure was performed.

As a result, as shown in FIG. 6, it was determined that the viability of melanoma cells was significantly reduced in the co-culture group of CD8+ T cells treated with the extracellular vesicles and melanoma cells.

The specific parts of the present invention have been described in detail above, and it is clear for those skilled in the art that these specific descriptions are merely preferred embodiments and the scope of the present invention is not limited thereto. Accordingly, the substantial scope of the present invention will be defined by the appended claims and their equivalents.

The scope of the present invention is indicated by the following claims, and all modifications or alternatives derived from the spirit and scope of the claims and their equivalents should be construed as being included in the scope of the present invention.

What is claimed is:

1. A method of treating a cancer disease, comprising:
administering a pharmaceutical composition comprising CD8+ T cells activated by extracellular vesicles derived from CD4+ T cells as an active ingredient to a subject.

2. The method of claim 1, wherein the CD4+ T cells are activated by a cytokine.

3. The method of claim 2, wherein the cytokine is one or more selected from the group consisting of IL-2, IL-4, IL-7, IL-9, IL-15, and IL-21.

4. The method of claim 1, wherein the extracellular vesicles increase proliferation and cytotoxicity of the CD8+ T cells to enhance an anticancer effect.

5. The method of claim 1, wherein the cancer disease is one or more selected from the group consisting of melanoma, skin cancer, lung cancer, liver cancer, stomach cancer, pancreatic cancer, bone cancer, head or neck cancer, uterine cancer, ovarian cancer, breast cancer, fallopian tube carcinoma, endometrial carcinoma, cervical carcinoma, vaginal carcinoma, vulvar carcinoma, Hawkins' disease, esophageal cancer, small intestine cancer, colorectal cancer, colon cancer, rectal cancer, perianal cancer, endocrine adenocarcinoma, thyroid cancer, parathyroid cancer, adrenal cancer, soft tissue sarcoma, urethral cancer, penile cancer, prostate cancer, chronic or acute leukemia, lymphocyte lymphoma, bladder cancer, kidney or ureter cancer, renal cell carcinoma, renal pelvic carcinoma, central nervous system tumor, primary central nervous system lymphoma, spinal cord tumor, brainstem glioma, and pituitary adenoma.

6. A method of treating a cancer disease, comprising:
administering a composition for immune anticancer agents to a subject, the composition comprising CD8+ T cells activated by extracellular vesicles derived from CD4+ T cells as an active ingredient.

7. The method of claim 6, wherein the CD4+ T cells are activated by a cytokine.

8. The method of claim 7, wherein the cytokine is one or more selected from the group consisting of IL-2, IL-4, IL-7, IL-9, IL-15, and IL-21.

9. The method of claim 6, wherein the extracellular vesicles increase proliferation and cytotoxicity of the CD8+ T cells to enhance an anticancer effect.

* * * * *

SEQUENCE LISTING

```
<160> NUMBER OF SEQ ID NOS: 10

<210> SEQ ID NO 1
<211> LENGTH: 20
<212> TYPE: DNA
<213> ORGANISM: Artificial Sequence
<220> FEATURE:
<223> OTHER INFORMATION: PD-1-f

<400> SEQUENCE: 1
agaatcctgg agacctcaac                                               20

<210> SEQ ID NO 2
<211> LENGTH: 20
<212> TYPE: DNA
<213> ORGANISM: Artificial Sequence
<220> FEATURE:
<223> OTHER INFORMATION: PD-1-r

<400> SEQUENCE: 2
atacccacta gggcactcat                                               20

<210> SEQ ID NO 3
<211> LENGTH: 21
<212> TYPE: DNA
```

```
<213> ORGANISM: Artificial Sequence
<220> FEATURE:
<223> OTHER INFORMATION: Ki-67-f

<400> SEQUENCE: 3
catcaaggaa cagcctcaac c                                              21

<210> SEQ ID NO 4
<211> LENGTH: 20
<212> TYPE: DNA
<213> ORGANISM: Artificial Sequence
<220> FEATURE:
<223> OTHER INFORMATION: Ki-67-r

<400> SEQUENCE: 4
gacctacggc gttgatcact                                                20

<210> SEQ ID NO 5
<211> LENGTH: 20
<212> TYPE: DNA
<213> ORGANISM: Artificial Sequence
<220> FEATURE:
<223> OTHER INFORMATION: IFN-r-f

<400> SEQUENCE: 5
gacaatgaac gctacacact                                                20

<210> SEQ ID NO 6
<211> LENGTH: 20
<212> TYPE: DNA
<213> ORGANISM: Artificial Sequence
<220> FEATURE:
<223> OTHER INFORMATION: IFN-r-r

<400> SEQUENCE: 6
taggctttca atgactgtgc                                                20

<210> SEQ ID NO 7
<211> LENGTH: 20
<212> TYPE: DNA
<213> ORGANISM: Artificial Sequence
<220> FEATURE:
<223> OTHER INFORMATION: Granzyme B-f

<400> SEQUENCE: 7
ctactgctga ccttgtctct                                                20

<210> SEQ ID NO 8
<211> LENGTH: 20
<212> TYPE: DNA
<213> ORGANISM: Artificial Sequence
<220> FEATURE:
<223> OTHER INFORMATION: Granzyme B-r

<400> SEQUENCE: 8
aaagtaaggc catgtagggt                                                20

<210> SEQ ID NO 9
<211> LENGTH: 20
<212> TYPE: DNA
<213> ORGANISM: Artificial Sequence
<220> FEATURE:
<223> OTHER INFORMATION: Perforin-f

<400> SEQUENCE: 9
tttcgcctgg tacaaaaacc                                                20
```

```
<210> SEQ ID NO 10
<211> LENGTH: 20
<212> TYPE: DNA
<213> ORGANISM: Artificial Sequence
<220> FEATURE:
<223> OTHER INFORMATION: Perforin-r

<400> SEQUENCE: 10
agggctgtaa ggaccgagat                                              20
```